United States Patent [19]

Terrill

[11] Patent Number: 5,501,532
[45] Date of Patent: Mar. 26, 1996

[54] TRUNNION ROLLER BEARING RETAINER

[75] Inventor: Arnold M. Terrill, Thomaston, Conn.

[73] Assignee: The Torrington Company, Torrington, Conn.

[21] Appl. No.: 344,192

[22] Filed: Nov. 23, 1994

[51] Int. Cl.[6] ..................................... F16C 33/46
[52] U.S. Cl. .......................... 384/572; 384/564; 384/584
[58] Field of Search ................................... 384/572, 564, 384/569, 575, 551, 584

[56] References Cited

U.S. PATENT DOCUMENTS

| | | |
|---|---|---|
| 2,057,102 | 10/1936 | Lemell . |
| 2,268,745 | 1/1942 | Frauenthal et al. . |
| 2,274,137 | 2/1942 | Frauenthal et al. . |
| 2,368,175 | 1/1945 | Thomas . |
| 2,567,242 | 9/1951 | Smith . |
| 2,606,798 | 8/1952 | Hickling . |
| 2,676,074 | 4/1954 | Nusbaum . |
| 2,818,313 | 12/1957 | Gales . |
| 3,348,889 | 10/1967 | Schaeffler et al. . |
| 3,447,848 | 6/1969 | Pitner . |
| 3,543,894 | 12/1970 | Giese ........................................ 384/572 |
| 4,565,458 | 1/1986 | Achee et al. ............................ 384/561 |

Primary Examiner—Lenard A. Footland
Attorney, Agent, or Firm—John C. Bigler

[57] ABSTRACT

There is provided a roller bearing having an outer roller race with an integral radially inwardly directed lip at each end. A complement of axially extending trunnion rollers is arranged between the lips. A removable retainer ring is interconnected to the lip to prevent radial displacement of the trunnion rollers. The retainer ring includes a cylindrical medial portion disposed concentrically inside the lip, an outer flange extending radially outwardly from one side of the medial portion and overlying a portion of the outer surface of the lip, and an inner flange extending from the other side edge of the medial portion and extending in an outwardly inclined direction and terminating in abutting relation with the inner surface of the lip.

15 Claims, 2 Drawing Sheets

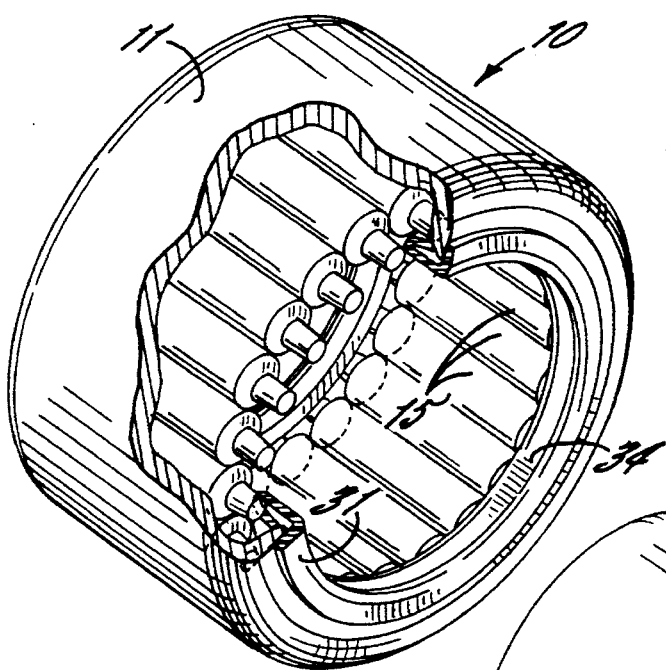
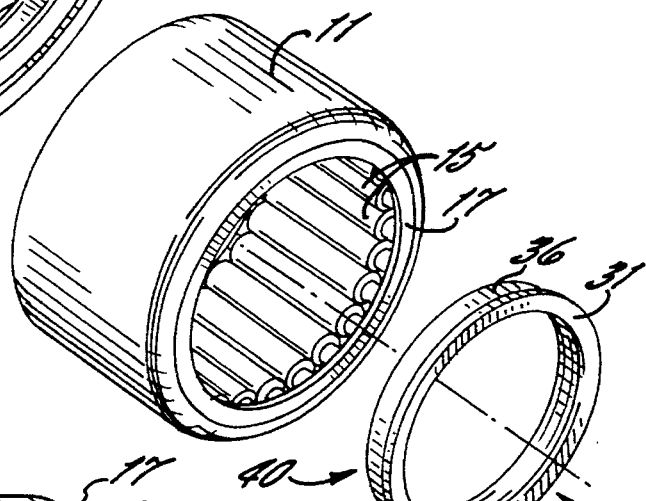
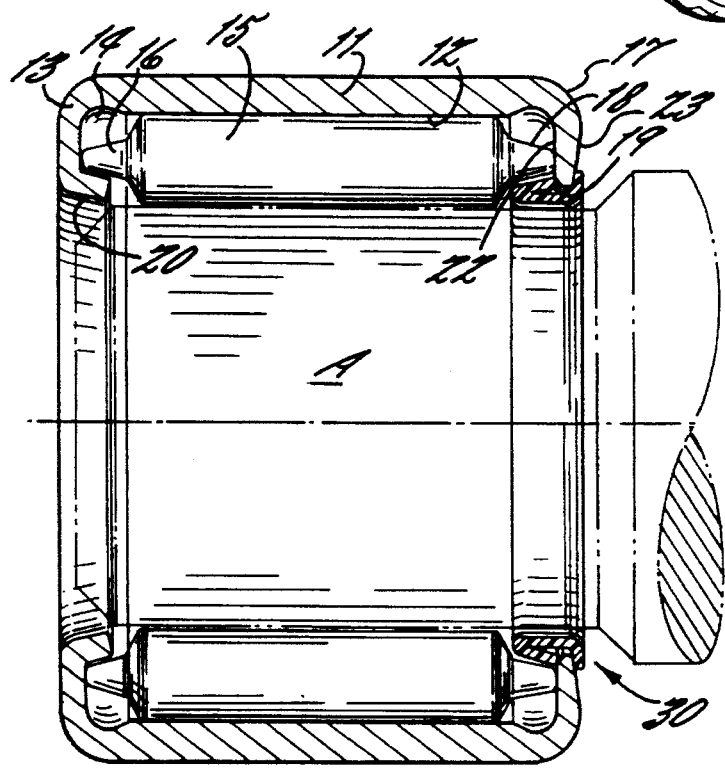
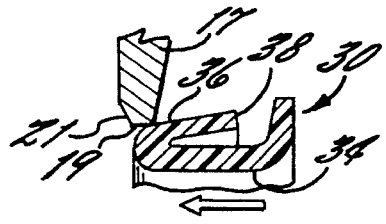
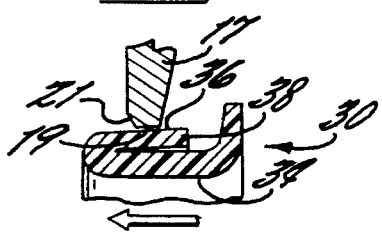

TRUNNION ROLLER BEARING RETAINER

BACKGROUND OF THE INVENTION

This invention relates generally to trunnion roller bearing retainers, and more particularly to a retainer ring for removably interconnecting the retainer and the lip of a roller race.

Roller bearings are often made by forming the outer race from an annular metal sleeve, one end of which is thereafter cupped to provide integral roller retaining means for preventing radial displacement of the rollers. An integrally inwardly turned radially extending lip is formed at the opposite end of the sleeve. A complement of trunnion rollers is placed in the race and one end is held in place in the cup end. A retainer ring is interconnected to the lip at the other end to prevent radial displacement of the trunnion rollers.

The ends of the cup and lip form axial thrust faces for the ends of the trunnion rollers. With a full complement of rollers, the cup end and lip in contact with the trunnions must be very hard to prevent wear. Typically, the roller race is made of low carbon steel and must be heated to harden it. However, once the sleeve part of the formed race is carburized through heating, it cannot be bent without cracking. The current practice in making formed races requires copper plating the partially curled end on the outside to a point slightly below the end of the raceway before heat treatment. The copper plate acts as a barrier to carbon in the heating process and prohibits hardening of the covered surface. After heat treatment, the copper plate is removed from the heat treated race. The trunnion rollers are placed in the hardened sleeve and then the open end is bent over to retain the rollers in the race. Therefore, it is desirable to fully form and heat treat the bearing cup without the need to copper plate the curled end, and to retain the rollers with a separate insert at assembly.

The foregoing illustrates limitations known to exist in the present practice of forming roller bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by a roller bearing formed from a metal sleeve providing a removable retainer ring interconnecting with a lip of the outer roller race to prevent radial displacement of the trunnion rollers. The roller bearing has a roller race with an integral radially inwardly directed lip at each end having an outer surface and an inner surface. A complement of axially extending trunnion rollers is arranged between the lips so that the inner surfaces act as axial thrust faces for the ends of the trunnion rollers. A retainer ring is interconnected to at least one of the lips for retaining the adjacent ends of the trunnion rollers in position in the race.

The retainer ring includes a cylindrical medial portion disposed concentrically inside a lip and an outer flange extending radially outwardly from one side edge of the medial portion and overlies a portion of the outer surface of the lip. The medial portion projects inwardly for interconnecting with the lip. In one embodiment, an eyelet-type arrangement having a cylindrical medial portion and an inner flange for removably interconnecting the retainer ring and the lip is provided. The medial portion extends inwardly from the outer flange in a plane generally perpendicular to the outer flange. The inner flange may be a resilient flexible arm attached to the end of the medial portion farthest from the outer flange and extending generally back toward the outer flange. The inner flange is biased outwardly in an inclined direction from the medial portion and terminates in a locking face which is in abutting relation with the inner surface of the lip. When inserted, the inner flange presses against the inner surface of the lip. In another embodiment, the retainer ring includes an inner flange having an outwardly inclined deformable protrusion extending into abutting relation with and being biased against the inner surface of the lip for interconnecting the retainer ring and the lip.

The foregoing and other aspects will become apparent from the following detailed description of the invention when considered in conjunction with the accompanying drawing figures.

BRIEF DESCRIPTION OF THE DRAWING FIGURES

FIG. 1 is a perspective view, partly in section, showing a typical trunnion roller bearing including the retainer of the present invention;

FIG. 2 is a partial perspective view showing separately the roller bearing and the retainer of the present invention;

FIG. 3 is an enlarged cross-sectional view through a roller bearing illustrating an embodiment of the present invention, showing the roller bearing mounted on a shaft;

FIG. 4 is a cross-sectional view illustrating an eyelet-type retainer ring interconnected with a trunnion roller race lip;

FIG. 5a is a cross-sectional view illustrating an eyelet-type retainer ring as the ring is about to be interconnected to a lip;

FIG. 5b is a cross-sectional view illustrating an eyelet-type retainer ring as the ring is being interconnected to a lip;

DETAILED DESCRIPTION

Figure 6:
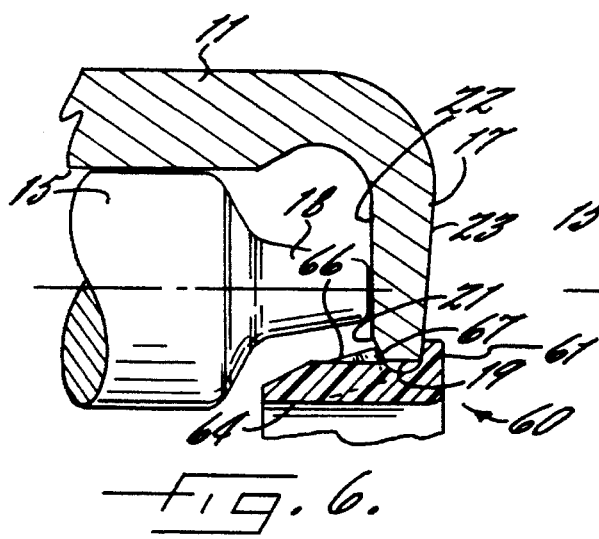
FIG. 6 is a cross-sectional view of an alternative embodiment of a retainer ring of the present invention.

The present invention is to a roller bearing having a retainer for retaining trunnion rollers in position in a roller race. As shown in the drawings and particularly in FIGS. 1 and 3, the roller bearing 10 includes an outer roller race 11. The outer roller race 11 may be made from flat sheet metal formed into a tubular sleeve. The roller race 11 has a roller raceway 12 on its inside periphery. The raceway 12 is that longitudinal portion of the inside periphery of the outer race 11 which is contacted by trunnion rollers 15. The roller bearing 10 is in contact with shaft A on which it is mounted.

As shown in FIG. 3 the roller race 11 has an integral inwardly turned radially extending lip 13 forming an end wall for roller retaining cup 14 sufficiently large to support the ends 16 of the trunnion rollers 15. At the opposite end of roller race 11 there is an integrally inwardly turned radially extending lip 17 forming an end wall. A complement of axially extending trunnion rollers 15 are arranged between the cup 14 and the lip 17. The roller retaining cup 14 includes the end wall formed by the lip 13 and an axially extending integrally formed roller retaining member 20. The lip 17 has an outer surface 23, an oppositely directed inner surface 22, and a terminal end 19. The terminal end 19 of lip. 17 preferably has a beveled surface 21 on the inner side of the terminal end which is beveled at an angle of about 30° to 45° to facilitate insertion of the retainer 30. The cup and the lip walls serve as axial thrust faces for the ends 16, 18, respectively, of the trunnion rollers 15. It should be understood that the end of roller bearing 10 wherein roller retaining cup 14 is described may be formed in the same manner as the other end of the roller bearing 10 wherein the retainer ring is used to retain the trunnion rollers. In FIG. 2, there is shown roller race 11 and retainer ring 30 separated from each other.

As shown in FIG. 4, a retainer ring 30 is interconnected to lip 17 for retaining the adjacent ends of the trunnion rollers 15 in position in the race 11. The retainer ring 30 is formed of deformable resilient material and comprises a cylindrical medial portion 34 disposed concentrically inside the lip 17 and an outer flange 31 extending radially outwardly from one side edge of medial portion 34 and overlying a portion of the outer surface of said lip 17.

In one embodiment, the retainer ring 30 has an eyelet-type arrangement which includes a cylindrical medial portion 34 disposed concentrically inside the lip 17 and an inner flange 36 extending from the other side edge of the medial portion 34 and extending in an outwardly inclined direction toward 34 and terminating in a locking face 38 in abutting relation with the inner surface 22 of the lip 17. When the retainer ring 30 is interconnected with the lip 17, the medial portion 34 extends inwardly away from and is generally perpendicular to lip 17. The inner flange 36 is attached to the end of the medial portion 34 that is farthest from the ring member portion 31 and is configured to overlie in spaced relation a portion of the medial portion 34. The inner flange 36 is biased outwardly from the medial portion 34 so that the inner flange 36 will resume a relaxed shape away from the medial portion 34 after being deflected toward the medial portion 34 to permit the inner flange 36 to resiliently flex toward the medial portion 34 so as to facilitate the assembly of the retainer ring 30 on the lip 17. The beveled edge 21 allows easy insertion of the retainer. In forming the interconnecting fit, the outer surface 23 of lip 17 is pressed against the interior surface of outer flange 31 while the locking face 38 at the terminal end of inner flange 34 is biased against the inner surface 22 of lip 17. The retainer ring 30 may be formed of molded plastic material.

As shown in FIG. 4, the locking face 38 of inner flange 36 extends slightly beyond the plane of beveled surface 21. As shown in FIG. 5A, positioning of the retainer ring 30 immediately within the end surface defined by terminal end 19 of the lip 17 causes deflection of the inner flange 36 toward the medial portion 34. As shown in FIG. 5B, as the medial portion 34 of the retainer ring 30 is moved further within the interior of lip 17 it passes into an interconnecting position. Once the medial portion 34 is inserted to its full extent, the inner flange 36 moves away from the medial portion 34 to a relaxed locked position, as shown in FIG. 4.

Thus, the locking face 38 engages the inner surface 22 of the lip 17 to retain the clip, thereby interconnecting the lip 17 and the retaining ring 30. The interconnection is maintained in place through forces upon either side surface of lip 17. The retaining ring 30 may be removed from the lip 17 by depressing the inner flange 36 and pulling the retainer structure away from the lip 17.

Figure 7:
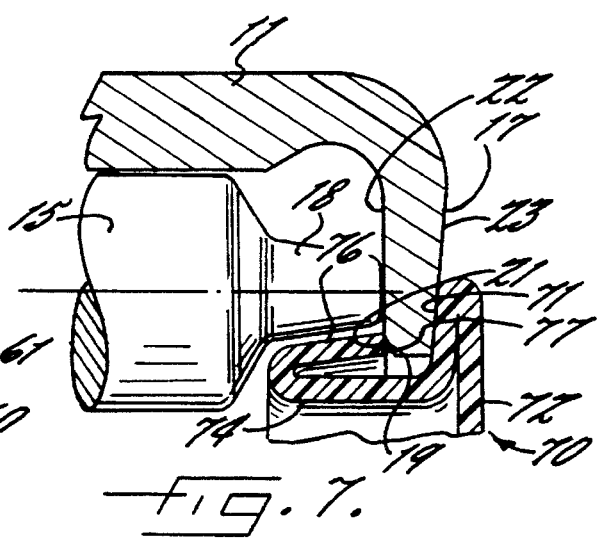
FIG. 7 is a cross-sectional view of another alternative embodiment of a retainer ring of the present invention.

There is shown in FIG. 7 an alternate embodiment of a retainer wherein the retainer ring 70 includes a cylindrical medial portion 74 disposed concentrically inside lip 17 and an outer flange 71 extending radially outwardly from one side edge of medial portion 74 and having a radially inwardly extending reinforcing member 72. The terminal end of inner flange 76 forms a locking face 77 which abuts against the inner surface of lip 17 in the area of the beveled edge 21. This eyelet-type arrangement functions in the same manner as the eyelet-type retainer shown in FIG. 4.

There is shown in FIGS. 6 and 8–11 an alternative embodiment of the present invention wherein the retainer clip is a molded-type clip of deformable material. As shown more specifically in FIG. 6, there is provided a retainer ring 60 interconnected to lip 17 for retaining the end 18 of trunnion roller 15 in position in the race 11. As shown in FIG. 6, a molded-type retainer ring 60 is formed of deformable resilient material and comprises an outer flange 61 extending radially outwardly from one side edge of the cylindrical medial portion 64 which is disposed concentrically inside lip 17. The medial portion 64 includes an inner flange 66 wherein the flange is an outwardly inclining deformable protrusion and terminating in a lock face 67 in abutting relation with and biased against the inner surface 22 of lip 17. The operation of the molded-type arrangement of retainer ring 60 shown in FIG. 6 is the same as the eyelet-type arrangement of retainer ring 30 shown in FIG. 4.

Figure 8:
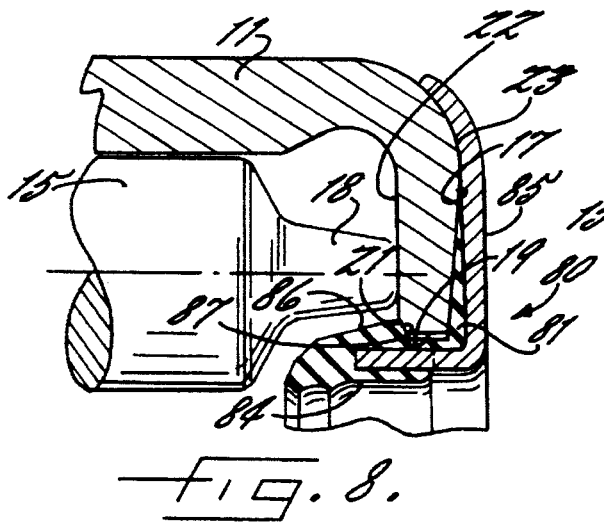
FIG. 8 is a cross-sectional view of still another alternative embodiment showing a molded retainer ring of the present invention.

FIG. 8 illustrates a molded clip of the type shown in FIG. 6 wherein the retainer ring 80 is formed of deformable resilient material and includes a outer flange 81 and inwardly extending cylindrical medial portion 84 disposed concentrically within lip 17. There is also provided ring member reinforcing metal strip 85 imbedded longitudinally into medial portion 84 and overlying outer flange 81 and a major portion of the outer surface 23 of lip 17. The retainer ring 80 also includes an inner flange 86 extending from the other side edge of medial portion 84 and a deformable protrusion 86 terminating in lock face 87 formed on the inner side of medial portion 84 for engaging the inner surface 22 of lip 17.

Figure 9:
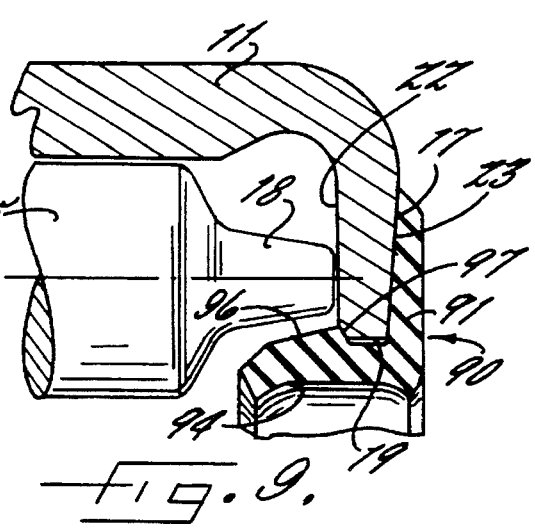
FIG. 9 is a cross-sectional view of an alternative embodiment showing a molded retainer ring of the present invention.

FIG. 9, similar to FIG. 6, shows a molded-type retainer ring 90 having an enlarged outer flange 91 extending radially outwardly from one side edge of a medial portion 94 and overlying a major portion of the outer surface 23 of lip 17. The enlarged outer flange 91 provides additional stability to the retainer ring 90. Medial portion 94 has an inner flange 96 extending from its other side edge, the inner flange having a deformable protrusion 96 terminating in a locking face 97 abutting the inner surface 22 of the lip 17 for interconnecting the retainer 30 and lip 17.

Figure 10:
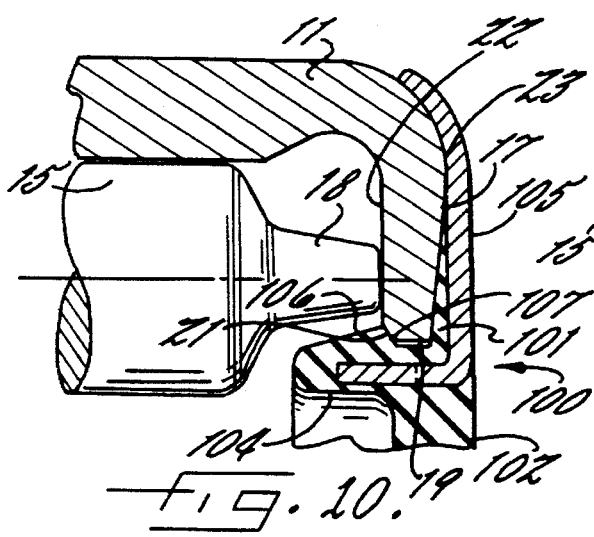
FIG. 10 is a cross-sectional view of an alternative embodiment showing a molded retainer ring of the present invention.

In the alternative embodiment shown in FIG. 10, which is similar to FIG. 8, there is shown molded retainer ring 100 of deformable resilient material having a circular outer flange 101 and inwardly cylindrical extending medial portion 104 disposed concentrically inside lip 17. The embodiment of FIG. 10 also includes a deformable lock face 107 at the terminated end of inner flange 106 for engaging the inner surface 22 of lip 17. A reinforcing metal strip 105 is imbedded longitudinally into medial portion 104 and overlies outer flange 81 and a major portion of the outer surface 23 of lip 17. The retainer ring 100 also has an inwardly radially extending outer reinforcing member, flange 102.

Figure 11:
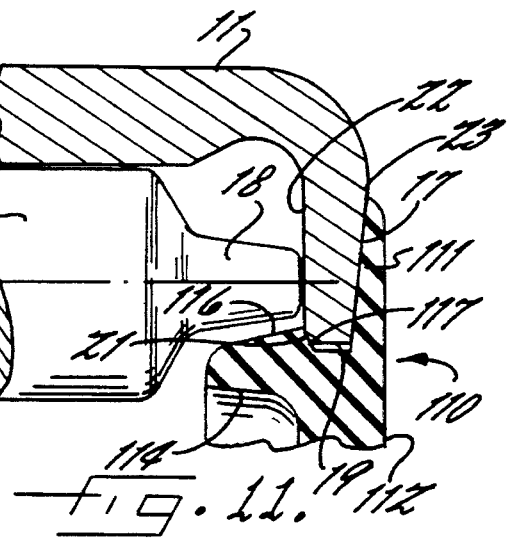
FIG. 11 is a cross-sectional view of an alternative embodiment showing a molded retainer ring of the present invention.

As shown in FIG. 11, there is provided a retainer ring 110 of deformable resilient material for retaining the end 18 of trunnion roller 15 in place in a roller race 11. The retainer ring 110 includes an annular outer flange 111 of sufficient width to extend along the major portion of the outer surface 23 of lip 17 when interconnected therewith. The retainer ring 110 also includes a cylindrical medial portion 114 extending inwardly from the outer flange 111 and disposed concentrically inside the lip 17 integral with outer flange 111. An inner flange 116 extends from the other end of the medial portion 114 terminating in a lock face 117 for engaging the inner surface 22 of the lip 17.

From the above description, it will;be apparent that the bearing roller retainer of the present invention provides a device for overcoming the limitations of the prior art by suitably and easily interconnecting the retainer and the lip of a roller race to maintain trunnion rollers in the race of the roller bearing.

While this invention has been illustrated and described in accordance with preferred embodiments, it is recognized that other variations and changes may be made therein without departing from the invention as set forth in the claims.

Having described the invention, what is claimed is:

1. A roller bearing comprising:
    an annular sleeve defining an outer roller race, and including an integral radially inwardly directed lip at each end thereof, with each of said lips having an outer surface and an oppositely directed inner surface;
    a complement of trunnion rollers arranged on said race between said lips so that said inner surfaces act as axial thrust surfaces for the ends of the trunnion rollers;
    a retainer ring mounted on at least one of said lips for retaining the adjacent ends of the trunnion bearings on said race, said retainer ring comprising:
    (a) a cylindrical medial portion disposed concentrically inside said one lip;
    (b) an outer flange extending radially outwardly from one side edge of said medial portion and overlying a portion of the outer surface of said one lip; and
    (c) an inner flange extending from the other side edge of said medial portion and extending in an outwardly inclined direction and into abutting relation with said inner surface of said one lip.

2. The roller bearing according to claim 1, wherein the inner surface of said lip has an outwardly beveled surface.

3. The roller bearing according to claim 1 wherein said inner flange is configured to overlie in spaced relation a portion of said medial portion of said retainer ring.

4. The roller bearing according to claim 3 wherein said retainer ring is continuous about its periphery, and is formed of a material which permits said inner flange to resiliently flex toward said medial portion of said retainer ring so as to facilitate the assembly of said retainer ring on said one lip.

5. The roller bearing according to claim 1, wherein said inner flange is an outwardly inclining deformable protrusion extending into abutting relation with and being biased against the inner surface of said lip.

6. The roller bearing according to claim 1 wherein said retainer ring comprises a molded plastic material.

7. The roller bearing according to claim 6, wherein said retainer ring includes a reinforcing member imbedded into said medial portion and overlying a major portion of the outer surface of said lip.

8. The roller bearing according to claim 1, wherein said retainer ring includes a radially inwardly extending reinforcing portion.

9. A retainer ring for retaining trunnion rollers in position in the race of an annular sleeve of a roller bearing having an integrally inwardly turned radially extending lip at each end of said sleeve with each of said lips having an outer surface and an oppositely directed inner surface, said retainer ring comprising:
    (a) a cylindrical medial portion adapted to be disposed concentrically inside said one lip;
    (b) an outer flange extending radially outwardly from one side edge of said medial portion and adapted to overlie a portion of the outer surface of said one lip; and
    (c) an inner flange extending from the other side edge of said medial portion and extending in an outwardly inclined direction and capable of forming an abutting relation with said inner surface of said one lip.

10. The retainer ring according to claim 9 wherein said inner flange is configured to overlie in spaced relation a portion of said medial portion of said ring.

11. The retainer ring according to claim 10 wherein said retainer ring is continuous about its periphery, and is formed of a material which permits said inner flange to resiliently flex toward said medial portion of said ring so as to facilitate the assembly of said ring on said one lip.

12. The retainer ring according to claim 9, wherein said inner flange is an outwardly inclined deformable protrusion extending in abutting relation with and biased against the inner surface of said lip.

13. The retainer ring according to claim 9, wherein said retainer ring comprises a molded plastic material.

14. The retainer ring according to claim 13, wherein said retainer ring includes a radially inwardly extending reinforcing member imbedded into said medial portion and overlying a major portion of the outer surface of said lip.

15. The retainer ring according to claim 9, wherein said retainer ring includes a radially inwardly extending reinforcing member.

* * * * *